Dec. 25, 1928.

F. C. RILE

FASTENING DEVICE

Filed Feb. 6, 1928

1,696,284

INVENTOR
F. C. RILE
BY
ATTORNEYS

Patented Dec. 25, 1928.

1,696,284

UNITED STATES PATENT OFFICE.

FREDERICK C. RILE, OF CHICAGO, ILLINOIS.

FASTENING DEVICE.

Application filed February 6, 1928. Serial No. 252,243.

My invention relates to improvements in fastening devices, and it consists in the combinations, constructions, and arrangements herein described and claimed.

An object of my invention is to provide a fastening device of the type employing a stationary arm and a movable arm, and in which means is provided for permitting the movable arm to be easily and quickly moved into longitudinal alignment with the stationary arm as when employing the device for fastening purposes, and for firmly holding the movable arm at a predetermined angle with respect to the stationary arm.

A further object of my invention is to provide a fastening device which while being efficient in operation and simple in construction, may easily be rendered ornamental.

Other objects and advantages will appear in the following specification, and the novel features of the invention will be particularly pointed out in the appended claims.

My invention is illustrated in the accompanying drawings, forming part of this application, in which Figure 1 is a top plan view of my device.

Figure 3:
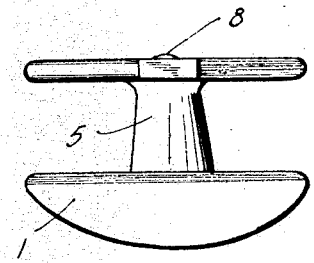
Figure 3 is a sectional view of the device showing the movable arm and the stationary arm disposed in longitudinal alignment.
Figure 4:
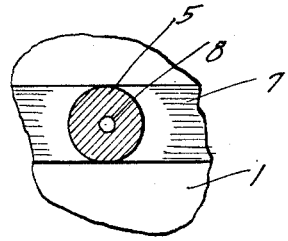
Figure 4 is a detail view of a portion of my device.

In carrying out my invention, I make use of a base 1 formed preferably from suitable sheet metal. The edge of the base 1 is bent inwardly and downwardly at 2 so as to rigidly secure a disc member 3, as shown in Figure 3. The disc member 3 is provided with a central opening 4.

Figure 1:
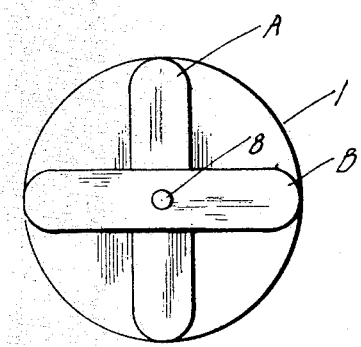
Figure 2:
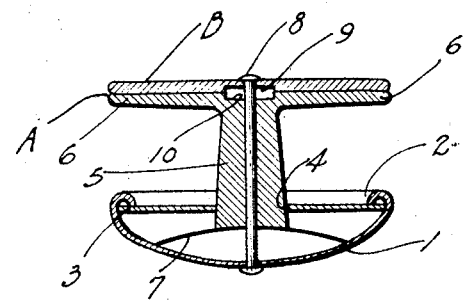
Figure 2 is a side elevation of the device shown in Figure 1.

A suitable sleeve 5 having an arm A comprising lateral extensions 6 is disposed within the opening 4, as shown in Figure 3. The inner end of the sleeve 5 bears against a suitable flat spring member 7. An arm B is preferably fixed with respect to the base 1 by means of a suitable bolt or rivet 8. The rivet 8 passes through the spring 7, as shown in Figure 3, and may be secured to the base 1 by welding or riveting, etc. The arm B is preferably fixed with respect to the rivet 8. The arms A and B are provided with recesses 9 and 10. As will be seen, these recesses are cut half way through the arms A and B so that when the former, that is to say the movable arm A is moved into the position shown in Figure 1, the arms A and B will be disposed in a common plane, as shown in Figure 2.

From the foregoing description of the various parts of the device, the operation thereof may be readily understood. When it is desired to employ my fastening device, the movable arm A which is integral with the sleeve 5 may be pressed downwardly against the tension of the spring 7 so as to disengage the arm A from the arm B and then turned into longitudinal alignment with the arm B, as shown in Figure 3. The arms A and B may then be inserted through a cut in the fabric or other articles which are being fastened. When the arms A and B have passed through the articles, the arm A may be turned about the axis of the rivet 8 for bringing the arm A into a position substantially at right angles to the stationary arm B, at which time the spring 7 will move the sleeve 5 and the arm A inwardly against the stationary arm B. It will thus be seen that at this time the arm A will be moved into a plane in common with the arm B by reason of the recesses 9 and 10.

Figure 5:
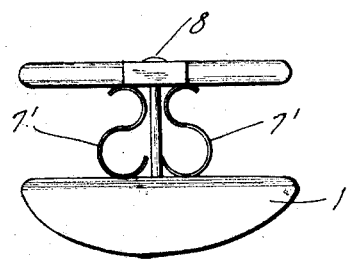
Figure 5 is a modified form of my device.

In Figure 5, I have shown a modified form of my device in which the movable arm is provided with suitable spring members 7′. In this form of the device, the movable arm is pivotally mounted upon the rivet and the spring members 7′ are disposed exterior of the base 1.

I claim:

1. A fastening device comprising a base, a stationary arm secured to the base, and a movable arm disposed between the base and said stationary arm for cooperating with said stationary arm.

2. A fastening device comprising a base, a stationary arm, means for securing said stationary arm in spaced relation with said base, and a movable arm rotatable about said means for cooperating with said stationary arm.

3. A fastening device comprising a hollow base having an opening, a stationary arm, means for securing said stationary arm in spaced relation with respect to said base, a movable arm rotatable about said means for cooperating with said stationary arm and having a sleeve disposed within said opening, and spring means disposed within the base and bearing against said sleeve for holding the movable arm in operative engagement with said stationary arm.

4. A fastening device comprising a hollow base having an opening, a stationary arm having a recess, means for securing said stationary arm in spaced relation with respect to said base, a movable arm having a recess and mounted for rotation about said means, a sleeve integral with said movable arm and disposed within said opening, and spring means disposed within the base and bearing against said sleeve for holding the movable arm in operative engagement with said stationary arm, whereby said recesses will be moved into registration when said movable arm is disposed in a position substantially at right angles to said stationary arm.

5. A fastening device comprising a semi-elliptical base, a disc having a central opening and arranged for closing said base, a stationary arm having a recess and spaced away from said base, means for holding said stationary arm in spaced relation with respect to said base, a movable arm mounted for rotation about said means and having a recess, a sleeve integral with the movable arm and rotatable about said means, said sleeve being arranged to project through the opening in said disc, and spring means disposed within the base and bearing against the sleeve, whereby said recesses will be moved into registration when said movable arm is disposed in a position substantially at right angles to said stationary arm.

6. A fastening device comprising a semi-elliptical base, a disc having a central opening and arranged for closing said base, the edges of said semi-elliptical base being bent inwardly and downwardly for rigidly securing the disc, a stationary arm having a recess and spaced away from said base, means for holding said stationary arm in spaced relation with respect to the base, a movable arm mounted for rotation about said means and having a recess, a sleeve integral with the movable arm and rotatable about said means, said sleeve being arranged to project through the opening in the disc, and spring means disposed within the base and bearing against the sleeve, whereby said recesses will be moved into registration when said movable arm is disposed in a position substantially at right angles to said stationary arm.

Signed at Chicago in the county of Cook and State of Illinois this 1st day of February, A. D. 1928.

FREDERICK C. RILE.